United States Patent
Dong et al.

(10) Patent No.: US 10,877,203 B2
(45) Date of Patent: Dec. 29, 2020

(54) LIGHT GUIDE PLATE AND METHOD FOR FABRICATING THE SAME, BACKLIGHT MODULE AND DISPLAY PANEL

(71) Applicants: Chongqing BOE Optoelectronics Technology Co., Ltd., Chongqing (CN); BOE TECHNOLOGY GROUP CO., LTD., Beijing (CN)

(72) Inventors: Xiaonan Dong, Beijing (CN); Zhonghao Huang, Beijing (CN); Yongliang Zhao, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/674,018

(22) Filed: Nov. 5, 2019

(65) Prior Publication Data

US 2020/0249391 A1     Aug. 6, 2020

(30) Foreign Application Priority Data

Jan. 31, 2019 (CN) .................. 2019 1 0101279

(51) Int. Cl.
*F21V 8/00* (2006.01)

(52) U.S. Cl.
CPC ......... *G02B 6/0065* (2013.01); *G02B 6/0055* (2013.01)

(58) Field of Classification Search
CPC .................. G02B 6/0055; G02B 6/0065
See application file for complete search history.

(56) References Cited

U.S. PATENT DOCUMENTS

| | | | |
|---|---|---|---|
| 2006/0002150 A1 | 1/2006 | Kim | |
| 2007/0122077 A1* | 5/2007 | Bellman | G01N 21/7743 385/37 |
| 2008/0049317 A1* | 2/2008 | Hara | G02B 5/0242 359/487.02 |
| 2011/0242796 A1* | 10/2011 | Yang | C09J 133/08 362/97.1 |

(Continued)

FOREIGN PATENT DOCUMENTS

| | | |
|---|---|---|
| CN | 101969078 A | 2/2011 |
| CN | 103226273 | 7/2013 |

(Continued)

OTHER PUBLICATIONS

First Office Action for Chinese Patent Application No. 20190101279.5 dated Jan. 20, 2020.

(Continued)

*Primary Examiner* — Eric T Eide
(74) *Attorney, Agent, or Firm* — Calfee, Halter & Griswold LLP (57) ABSTRACT

A light guide plate, a method for fabricating the same, a backlight module, and a display panel are disclosed. The light guide plate includes a flexible base layer, a photonic crystal array layer on the flexible base layer, and a transparent planarization layer encapsulating the photonic crystal array layer. The photonic crystal array layer includes photonic crystals which are arranged in an array.

15 Claims, 6 Drawing Sheets

(56) References Cited

U.S. PATENT DOCUMENTS

| | | | |
|---|---|---|---|
| 2013/0229827 A1* | 9/2013 | Takase | G02B 6/0031 |
| | | | 362/609 |
| 2016/0061994 A1 | 3/2016 | Noda et al. | |
| 2020/0081173 A1* | 3/2020 | Tak | H01L 27/322 |
| 2020/0108587 A1* | 4/2020 | Han | B32B 27/281 |

FOREIGN PATENT DOCUMENTS

| | | |
|---|---|---|
| CN | 103389538 A | 11/2013 |
| CN | 105143923 | 12/2015 |
| CN | 109273501 A | 1/2019 |
| KR | 20170103421 A | 9/2017 |

OTHER PUBLICATIONS

Office action from Chinese Application No. 201910101279.5 dated Jun. 9, 2020.

\* cited by examiner

LIGHT GUIDE PLATE AND METHOD FOR FABRICATING THE SAME, BACKLIGHT MODULE AND DISPLAY PANEL

RELATED APPLICATIONS

The present application claims the benefit of Chinese Patent Application No. 201910101279.5, filed Jan. 31, 2019, the entire disclosure of which is incorporated herein by reference.

TECHNICAL FIELD

The present disclosure relates to the field of display technologies and particularly to a light guide plate, a method for fabricating the same, a backlight module, and a display panel.

BACKGROUND

With the development of display technologies, the wide application of display devices, and higher requirements for display devices raised by users, flexible display technology has become an important direction for the development of display technologies.

Among current flexible display panels, a TFT (thin film transistor) LCD (liquid crystal display) (i.e., TFT-LCD) panel has become one of the mainstream products due to advantages of its good mass production characteristic, high degree of automation, low cost of raw materials. A backlight module is one of the important components of the flexible LCD display panel. Usually, a customized frame is required to bend the backlight module by a certain angle according to the requirements of the flexible display panel. During application to the flexible display panel, the backlight module is bent by the certain angle.

SUMMARY

Exemplary embodiments provide a light guide plate, comprising: a flexible base layer, a photonic crystal array layer on the flexible base layer, and a transparent planarization layer encapsulating the photonic crystal array layer, wherein the photonic crystal array layer comprises photonic crystals which are arranged in an array.

In some exemplary embodiments, in the light guide plate as described above, the photonic crystals of the photonic crystal array layer have a hollow structure.

In some exemplary embodiments, in the light guide plate as described above, the photonic crystals of the photonic crystal array layer are crystals of inorganic silicon dioxide.

In some exemplary embodiments, in the light guide plate as described above, the photonic crystals of the photonic crystal array layer are nanoscale crystals.

In some exemplary embodiments, in the light guide plate as described above, the transparent planarization layer is a surfactant layer.

In some exemplary embodiments, the light guide plate as described above further comprises: a first reflector sheet on a side of the flexible base layer away from or facing the photonic crystal array layer, and second reflector sheets on four side faces of the light guide plate, respectively.

In some exemplary embodiments, in the light guide plate as described above, the photonic crystals have a spherical structure.

Exemplary embodiments further provide a backlight module, comprising: a light source, and any light guide plate as described above.

In some exemplary embodiments, in the backlight module as described above, the light source is arranged on a side face of the light guide plate; the light source is arranged in the light guide plate on a side of the flexible base layer away from photonic crystal array layer; or the light source is arranged on a side of the transparent planarization layer away from the flexible base layer.

Exemplary embodiments further provide a display panel, comprising any backlight module as described above.

Exemplary embodiments further provide a method for fabricating a light guide plate, comprising: depositing photonic crystals which are arranged in an array on a flexible base layer, to form a photonic crystal array layer; and forming a transparent planarization layer on the photonic crystal array layer, to encapsulate the photonic crystals.

In some exemplary embodiments, in the method for fabricating a light guide plate as described above, the transparent planarization layer is a surfactant layer which is coated to surround the photonic crystal array layer, and after forming the transparent planarization layer, the method further comprises: wet etching the photonic crystal array layer to form hollow photonic crystals.

BRIEF DESCRIPTION OF THE DRAWINGS

Drawings are to facilitate further understanding of technical solution of embodiments of the present disclosure and act as a part of the specification. The drawings in combination with exemplary embodiments are used to explain rather than to limit the technical solutions in the embodiments of the present disclosure.

DETAILED DESCRIPTION

To better clarify objectives, technical solutions and advantages of the present disclosure, embodiments of the present disclosure are detailed hereinafter in conjunction with drawings. It should be noted that the exemplary embodiments of the disclosure can be combined or features in the exemplary embodiments can be combined in any way as long as no conflict is caused.

In recent years, a large size flexible display has gradually been introduced into customers' daily life, and has led a trend in visual experience. Thus, many large technical companies have been attracted by the potentially huge market, and have entered the field of large size flexible display technologies with pioneering research.

A known display panel primarily comprises a LCD display panel as mentioned in the background and an OLED (organic electroluminance display) panel. An ultra-thin, ultra-light, and large size LCD display panel has become a highlight in current display technologies due to its excellent properties in term of brightness, contrast, dimension, weight. The OLED display panel becomes one of the most competitive displays due to its features of self-illumination, wide viewing angle, ultra-light, ultra-thin, and low consumption. However, the mass production of the OLED display panel is restrained by its high cost of research, development and production. In comparison, LCD has been paid more attention due to its good mass production characteristic, high degree of automation, low cost of raw materials, and exceptional growth potential. A COA (color filter on array) flexible curved display, which is developed from the LCD display technologies, has become an important application of the flexible display panel, and has quickly occupied the emerging market.

The backlight module is an important component of the COA flexible display panel, and is usually required to be bent by a customized bent frame by a certain angle so as to meet the requirement of the flexible display panel. However, the backlight module is prone to structural aging and damage under external stress for a long period of time and change in climatic environment. As discussed in the above background, the backlight module of the COA flexible display panel suffers from the following drawbacks. Firstly, upon application of stress, some structural components (e.g. the light guide plate) in the backlight module is prone to aging and damage. Secondly, as one of the important components in the backlight module, the light guide plate has a complex fabricating process and a relatively high fabricating cost, and has a risk of light leakage due to plastic deformation caused by the presence of stress for a long period of time. Thirdly, the light guide plate is made from an organic material which is prone to corrosion and aging under light irradiation for a long period of time, and this will seriously affect the service life. Therefore, improving the service life of the light guide plate in the flexible LCD display panel and avoiding plastic deformation of the light guide plate caused by the presence of stress for a long period of time are important considerations for improving the operational performance of the backlight module in the flexible LCD display panel.

Specific embodiments of the present disclosure can be combined with one another, and description of identical or similar concepts or processes may not be repeated in some embodiments.

Figure 1:
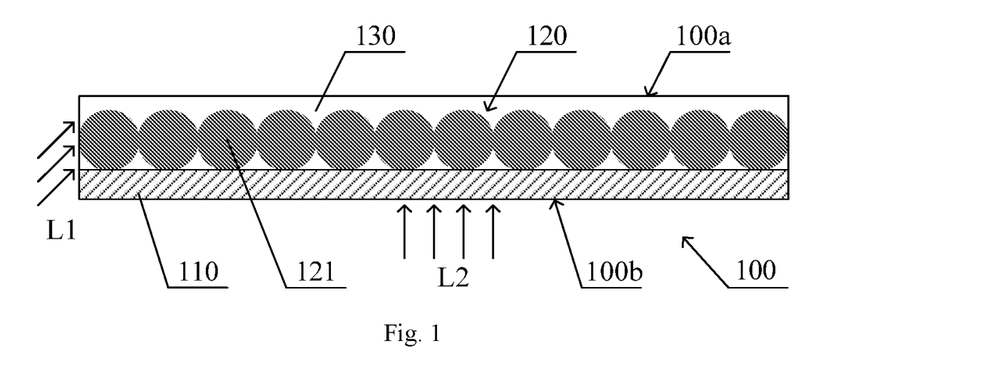
FIG. 1 is structural view for illustrating a light guide plate according to exemplary embodiments.
Figure 2:
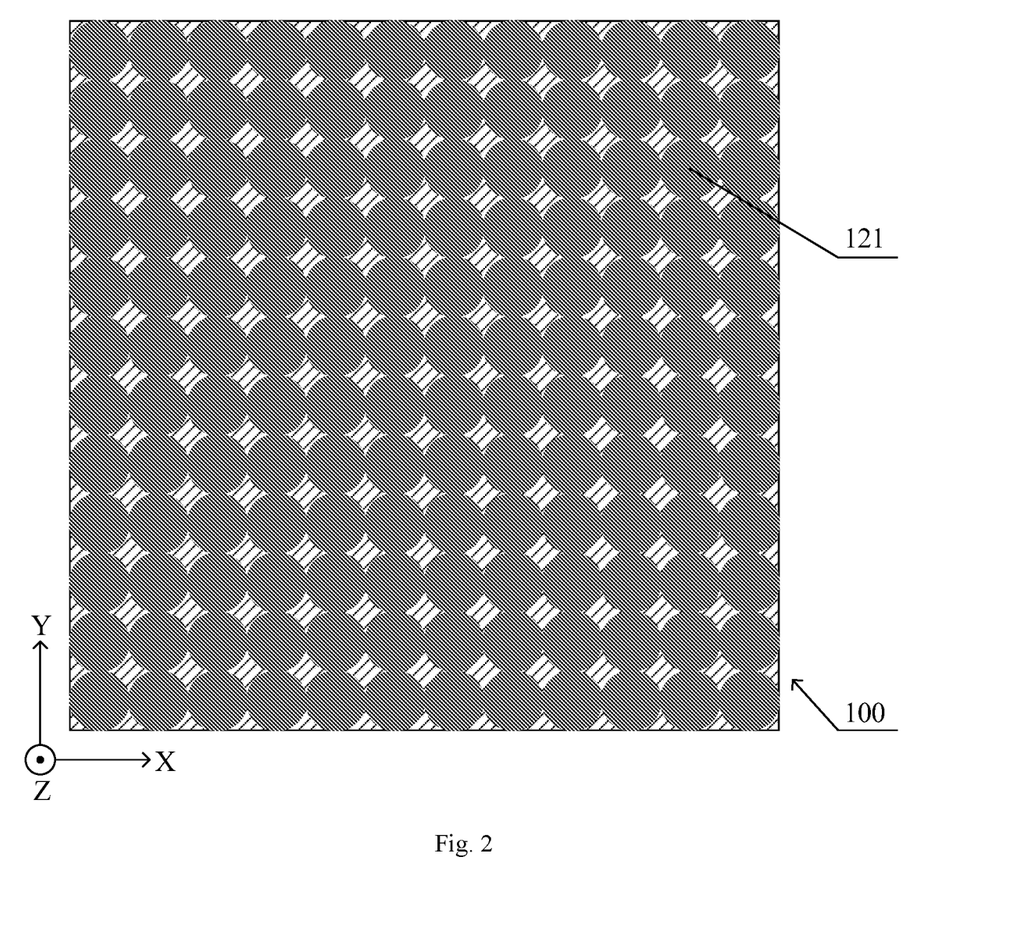
FIG. 2 is a top view for illustrating the light guide plate in embodiments of FIG. 1.

FIG. 1 is a structural view which illustrates a light guide plate according to exemplary embodiments. FIG. 1 is a cross-sectional view of a light guide plate 100, FIG. 2 is a top view of the light guide plate in the exemplary embodiment shown in FIG. 1. As shown in FIG. 1 and FIG. 2, the light guide plate 100 in exemplary embodiments can comprise: a flexible base layer 110, a photonic crystal array layer 120 which is arranged on the flexible base layer 110, and a transparent planarization layer 130 which encapsulates the photonic crystal array layer 120.

In the light guide plate 100 according to exemplary embodiments, the photonic crystal array layer 120 comprises photonic crystals 121 which are arranged in an array.

The light guide plate 100 according to exemplary embodiments can be used in the backlight module of the flexible LCD display panel. The backlight module can act as an edge type backlight unit or a direct type backlight unit for the LCD display panel. As a primary structure of the backlight module for the flexible LCD display panel, the light guide plate 100 has a structure capable of deforming flexibly. Therefore, the flexible base layer 110 can be used as a substrate for the overall structure of the light guide plate 100.

A structure for effectively scattering light is usually arranged on the flexible base layer of the light guide plate. In exemplary embodiments, the photonic crystal array layer 120 comprises a plurality of photonic crystals 121 which are arranged in an array, and is used as the structure for scattering light. Generally, the light from the light source enters the light guide plate of the backlight module through a side of the light guide plate. Based on the principle by which light is scattered by the light guide plate, light is uniformly distributed in the light guide plate. However, due to the complex process and potential defects of material for the known light guide plate, the planar distribution uniformity of light in the light guide plate is restricted to a certain extent. Since the light guide plate 100 comprises photonic crystals 121 which are arranged in an array, these photonic crystals 121 create a two-dimensional optical reflection face on the flexible base layer 110. As a result, after the light from the light source is incident onto the photonic crystal array layer 120 of the light guide plate 100, it is subject to multiple diffuse reflections in the photonic crystals 121 which are arranged in an array, so that the light reflection mechanism is destroyed. The requirements of uniform distribution of light in the light guide plate 100 can be realized, which improves the planar distribution characteristic of the light source. Namely, due to the effect of the light guide plate 100 on light, the light guide plate 100 can be deemed as a planar light source in case it acts as a light source.

It is noted that the photonic crystals 121 which are arranged in an array in the X direction, Y direction and Z direction, as shown in FIG. 2, has the function of realizing diffusion to the maximum extent in the X and Y direction. Since the photonic crystals 121 usually only has a height of tens of nanometers (nm) in the Z direction, while the diffusion extent of light in the X and Y direction is significantly larger than the diffusion extent in the Z direction. Thus, the photonic crystal array layer 120 can be deemed as a two-dimensional optical reflection structure. In addition, in case the light source is the edge type light source, the light source can be arranged on one side face of the light guide plate 100. In this case, light is incident onto the one side face of the light guide plate 100, as shown in the light L1 of FIG. 1. In case the light source is the direct type light source, the light source can be arranged on a top face 100a or a bottom face 100b of the light guide plate 100 (in the example of FIG. 1, 100a is the top face, and 100b is the bottom face, but the top face and the bottom face can be exchanged in practical implementations). The light is incident onto the top face 100a or the bottom face 100b of the light guide plate 100. In the example of the light guide plate 100 shown in FIG. 1, the light L2 is incident onto the bottom face 100b. FIG. 1 schematically shows the incident position of the light L1 from the edge type light source and the light L2 from the direct type light source. In practical implementations, the light L1 or the light L2 is selectively adopted as the incident light of the light guide plate 100.

In the light guide plate 100 according to exemplary embodiments, the effect of the photonic crystal array layer 120 on the incident light, i.e., multiple diffuse reflections in the photonic crystals 121, make the light uniformly distributed in the light guide plate 100. Therefore, as compared with the light guide plate in the known LCD display panel, in the light guide plate 100 according to exemplary embodiments of the present disclosure, the photonic crystals 121 which are arranged in an array creates a two-dimensional optical reflection face on the flexible base layer 110. As a result, after the light enter the light guide plate 100, it is subject to multiple diffuse reflections in the photonic crystals 121 which are arranged in an array, so that the light reflection mechanism is destroyed, and a light source formed by the light in the light guide plate 100 has an improved planar distribution characteristic.

In addition, in embodiments of the present disclosure, in order to guarantee the structural stability of the photonic crystals 121, a layer of the transparent planarization material 130 can be formed on the photonic crystal array layer 120. Since the photonic crystal array layer 120 is formed by the plurality of photonic crystals 121 which are arranged in an array, these photonic crystals 121 are crystals with a shape of round sphere which are attached on the flexible base layer 110. As can be seen from FIG. 1, a contact area between the photonic crystals 121 and the flexible base layer 110 is relatively small, and a contact area between the neighboring photonic crystals 121 is also relatively small. Therefore, the photonic crystal array layer 120 formed by the photonic crystals 121 has relatively poor structural stability. In embodiments of the present disclosure, the transparent planarization layer 130 can be formed by a liquid solvent, to encapsulate the photonic crystals 121, fill up a gap between the photonic crystal array layer 120 and the flexible base layer 110, and planarize an upper surface of the photonic crystal array layer 120 (i.e., a face of the photonic crystal array layer 120 away from the flexible base layer 110).

According to exemplary embodiments, the light guide plate 100 comprises the flexible base layer 110, the photonic crystal array layer 120 on the flexible base layer 110, and the transparent planarization layer 130 encapsulating the photonic crystal array layer 120. The photonic crystal array layer 120 comprises the plurality of photonic crystals 121 which are arranged in an array. Based on the structure of the light guide plate 100 as described above, i.e., the photonic crystals 121 creates a two-dimensional optical reflection face of on the flexible base layer 110. As a result, after the light from the light source enters the photonic crystal array layer 120 of the light guide plate 100, it is subject to multiple diffuse reflections in the photonic crystals 121 which are arranged in an array, so that the light reflection mechanism is destroyed. The requirements of uniform distribution of light in the light guide plate 100 can be realized, which improves the planar distribution characteristic of the light source. Namely, the light guide plate 100 is suitable for the backlight module of LCD display panel. In the light guide plate 100 according to embodiments of the present disclosure, both the flexible base layer 110 and the photonic crystals 121 have an excellent structural flexibility, and the overall structure has a relatively high elastic deformation. Even if the light guide plate 100 is subject to external stress for a long period of time and is bent by a certain angle, the light guide plate 100 is less subject to phenomenon of structural aging and damage. This solves the following problems in the known flexible LCD display panel. In the known flexible LCD display panel, the backlight module is required to be bent by a certain angle, and this causes decrease in the service life of the light guide plate in the backlight module due to aging. Besides, plastic deformation may cause the problem of light leakage in the display panel.

Figure 3A:
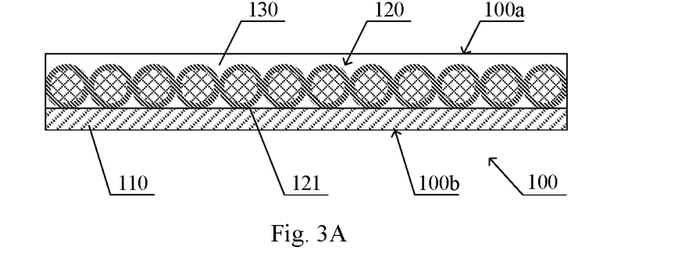
FIG. 3A is a structural view for illustrating a light guide plate according to exemplary embodiments.
Figure 3B:
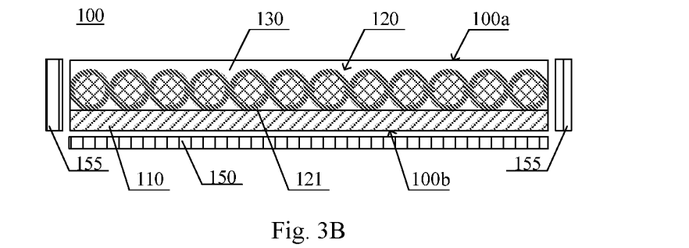
FIG. 3B is a structural view for illustrating a light guide plate according to exemplary embodiments.
Figure 3C:
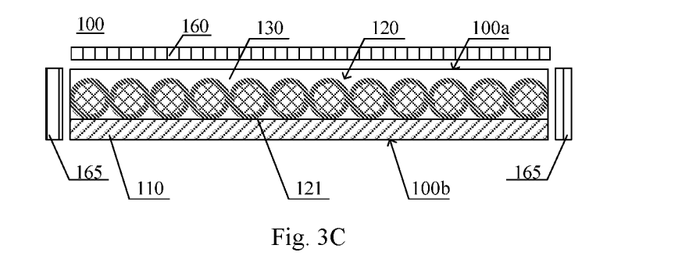
FIG. 3C is a structural view for illustrating a light guide plate according to exemplary embodiments.
Figure 4:
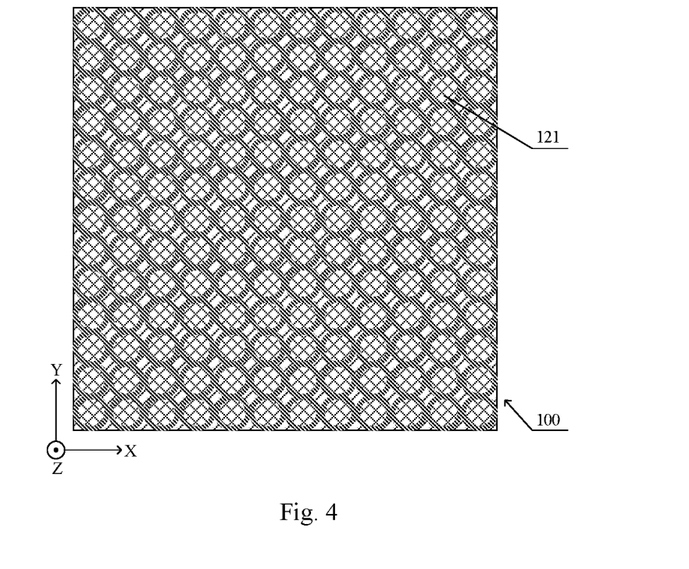
FIG. 4 is a top view for illustrating the light guide plate in embodiments of FIG. 3.

In some exemplary embodiments, FIG. 3 is a structural view for a light guide plate according to embodiments of the present disclosure. FIGS. 3A-3C show cross-sectional views of the light guide plate 100 according to different embodiments respectively, and FIG. 4 is a top view of the light guide plate in the exemplary embodiment of FIG. 3a. Referring to FIGS. 3A-3C and FIG. 4, on basis of the structural base of the light guide plate 100 shown in FIG. 1 and FIG. 2, in the light guide plate 100 according to embodiments of the present disclosure, the photonic crystals 121 in the photonic crystal array layer 120 have a hollow structure. In the light guide plate 100 shown in FIG. 1 and FIG. 2, round spheres in gray indicates the solid photonic crystals 121. In the light guide plate 100 of FIG. 3A and FIG. 4, round spheres with a gray outer shell and filled by a shade indicate the hollow photonic crystals 121. In addition, in FIGS. 1-4, since the transparent planarization layer 130 encapsulates the photonic crystals 121, a transparent film is used to indicate the transparent planarization layer 130.

In some exemplary embodiments, although the solid photonic crystals 121 can diffusely reflect the light which is incident onto the light guide plate 100 for multiple times, and the light reflection mechanism is destroyed. However, the light has a relatively regular optical path in the solid photonic crystals 121. The hollow photonic crystals 121 can be formed by wet etching the solid photonic crystals 121. Due to the etching effect of and the etching uniformity of the etch solvent, an internal surface of the shell of the hollow photonic crystals 121 is not flat, but has a surface with a certain roughness. Therefore, the array of these hollow photonic crystals 121 creates a two-dimensional optical reflection face on the flexible base layer 110, and has improved effect of diffuse reflection on the light incident onto the photonic crystal array layer 120 of the light guide plate 100. As a result, the planar distribution characteristic of the light guide plate 100 acting as light source is improved. Namely, the uniformity of light in the overall light guide plate 100 is improved.

Optionally, as described above, the hollow photonic crystals 121 can be formed by wet etching the solid photonic crystals 121. In this solution, a material for forming the transparent planarization layer 130 can be a surfactant solution. Namely, the transparent planarization layer 130 can also be referred to as a surfactant layer. The surfactant solution can be stuck to the photonic crystals 121 which are arranged in an array, fill up the gap between the photonic crystals 121 and the flexible base layer 110 and the gap between the neighboring photonic crystals 121, and planarize the upper surface of the photonic crystal array layer 120. After the photonic crystals 121 encapsulated by the surfactant solution (i.e., the transparent planarization layer 130) as described above is dipped in a wet etching solution, the etch solution can penetrate the surfactant solution to erode the interior of the solid photonic crystals 121. However, due to protection of the surfactant solution, surface of the solid photonic crystals 121 onto which the surfactant solution is attached is not eroded by the etch solution. Namely, the solid photonic crystals 121 are etched into the hollow photonic crystals 121 with an outer shell, and the internal surface of the outer shell of the hollow photonic crystals 121 has a certain roughness.

In some exemplary embodiments, the photonic crystals 121 in the photonic crystal array layer 120 can be crystals of inorganic silicon dioxide.

In some exemplary embodiments, the photonic crystals 121 in the photonic crystal array layer 120 can be nanoscale crystals.

In some exemplary embodiments, the photonic crystals 121 in the photonic crystal array layer 120 can be spherical structures of equal size, as shown in FIGS. 1-4.

In exemplary embodiments, the photonic crystal array layer 120 can be a closely-stacked structure which is formed by nano-scale photonic crystals 121 arranged in an array. To realize that a two-dimensional mesh of self-assembled metal nanowires has "isotropical" conductivity and uniformity of photo permeability, a stacked structure in an array is adopted in embodiments of the present disclosure. In this way, units in the two-dimensional mesh of self-assembled metal nanowires exhibit graphene-like conductivity and photo permeability.

It is noted that, in combination with the features as described above, the photonic crystals 121 in embodiments of the present disclosure can be photonic crystals 121 of a inorganic nanomaterial. The inorganic nanomaterial has been widely applied in optoelectronic devices, due to its features of extensive sources, environmentally friendly, stable physical and chemical properties, and strong resistance to photo-induced erosion. In view of inorganic silicon dioxide has stable physical and chemical properties and is resistant to photo-induced erosion, by using crystals of inorganic silicon dioxide as a light transmission medium for light can greatly extend the service life of the inorganic the light guide plate 100. In addition, by means of nano-scale effect, the nano-scale hollow silicon dioxide photonic crystals 121 which are arranged in an array have excellent mechanics, mechanical, physical and chemical properties. With the cooperation of the surfactant layer (i.e., the transparent planarization layer 130), it can alleviate external stress. As a result, components of the inorganic light guide plate 100 have excellent flexibility, and thus are applied to the fast-growing flexible backlight technological field.

As described in the above exemplary embodiments, in case the light guide plate 100 according to exemplary embodiments acts as a component in the backlight module of the LCD display panel, it can act as the edge type backlight unit or the direct type backlight unit.

In exemplary embodiments, referring to FIG. 3B, the light guide plate 100 can further comprise: a first reflector sheet 150 which is arranged on a side of the flexible base layer 110 away from the photonic crystal array layer 120 and second reflector sheets 155 which are arranged on four side faces of the light guide plate 100. In alternative embodiments, referring to FIG. 3C, the light guide plate 100 can further comprise: a first reflector sheet 160 which is arranged on a side of the transparent planarization layer 130 away from the flexible base layer 110, and second reflector sheets 165 which are arranged on four side faces of the light guide plate 100.

In certain exemplary embodiments, description is made by referring to an example in which the backlight module formed by the light guide plate 100 acts as the edge type backlight module. In this case, one of the side faces of the light guide plate 100 acts as a light incidence face of the edge type backlight unit. The light source can be arranged between the second reflector sheets at a side of the light incidence face and the overall structure (formed by 110, 120 and 130). In this implementation, as shown in FIGS. 1-4, one of the top face 100a (i.e., a face of the transparent planarization layer 130 away from the flexible base layer 110) and the bottom face 100b (i.e., a face of the flexible base layer 110 away from the photonic crystal array layer 120) of the light guide plate 100 is the light exit face. The first reflector sheet can be arranged on one of the top face 100a and the bottom face 100b as described above. A face on which the reflector sheet is not arranged is the light exit face of the light guide plate 100. The faces on which reflector sheets are arranged can reflect light arriving at these faces so that light is uniformly distributed in the light guide plate 100.

In certain exemplary embodiments, reference is made to an example in which the backlight module formed by the light guide plate 100 acts as a direct type backlight module. In this case, the top face 100a of the light guide plate 100 (i.e., a face of the transparent planarization layer 130 away from the flexible base layer 110) or the bottom face 100b of the light guide plate 100 (i.e., a face of the flexible base layer 110 away from the photonic crystal array layer 120) acts as the light incidence face of the direct type backlight unit. The first reflector sheet can be arranged the light incidence face, and the opposite face acts as a light exit face on which no reflector sheet is arranged. The light source can be arranged between the first reflector sheet at the light incidence face and the overall structure (formed by 110, 120 and 130). The remaining faces, i.e., four side faces of the light guide plate 100, are provided with the second reflector sheets, to reflect light arriving at these faces. As a result, light is uniformly distributed in the light guide plate 100.

It is noted that in exemplary embodiments, the light exit face of the light guide plate 100 can be a face of the light guide plate 100 facing the thin film transistor (TFT) array layer when the light guide plate 100 is arranged on the LCD display panel. Namely, in the light guide plate 100 shown in FIGS. 1-4, both the top face 100a and the bottom face 100b can act as the light exit face.

Figure 5:
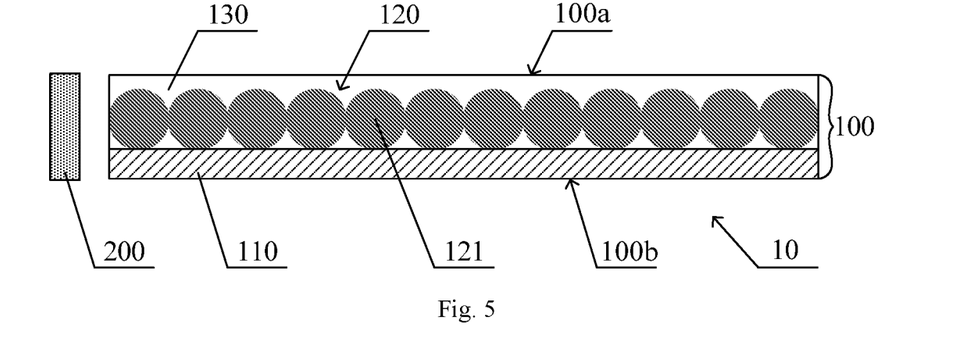
FIG. 5 is a structural view for illustrating a backlight module according to exemplary embodiments.

Based on the light guide plate 100 in embodiments as described above, exemplary embodiments further provide a backlight module 10. FIG. 5 is a structural view of a backlight module according to exemplary embodiments. According to exemplary embodiments, the backlight module 10 can comprise a light source 200, and the light guide plate 100 as shown in any one of the exemplary embodiments of FIGS. 1-4. As for the light guide plate 100 of FIG. 5, the light guide plate shown in FIG. 1 is taken as an example. Besides, as an example, the light source 200 of FIG. 5 is arranged on one of the side faces of the light guide plate 100. In this case, the backlight module 10 is an edge type backlight module.

Figure 6:
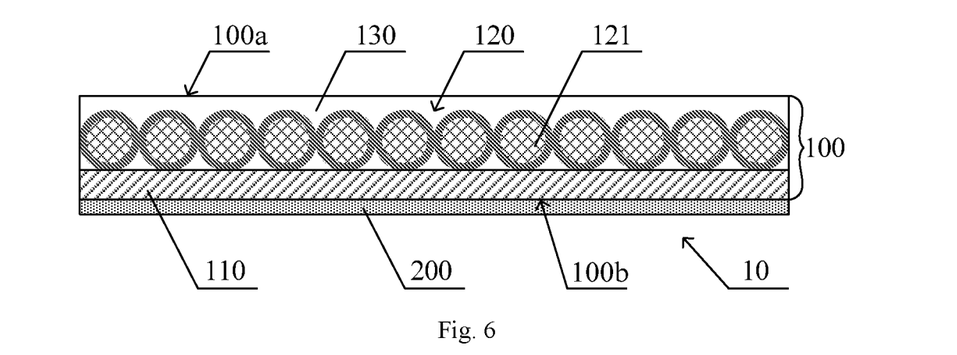
FIG. 6 is a structural view for illustrating a backlight module according to exemplary embodiments.

In some exemplary embodiments, the light source 200 can further be arranged in the light guide plate 100 on a side of the flexible base layer 110 away from the photonic crystal array layer 120. FIG. 6 shows a structural view of a backlight module according to exemplary embodiments. As for the light guide plate 100 of FIG. 6, the light guide plate shown in FIG. 3A is taken as an example. The backlight module 10 of FIG. 6 is a direct type backlight module. Besides, in the example of FIG. 6, the bottom face 100b of the light guide plate 100 (i.e., a face of the flexible base layer 110 away from the photonic crystal array layer 120) is the light incidence face, and the top face 100a (i.e., a face of the transparent planarization layer 130 away from the flexible base layer 110) is the light exit face. In exemplary embodiments of the direct type backlight module, the light source can further be arranged on a face of the transparent planarization layer 130 away from the flexible base layer 110. In this case, the top face 100a of the light guide plate 100 is the light incidence face, and the bottom face 100b is the light exit face.

It is noted that the reflector sheet of the light guide plate 100, the arrangement of reflector sheet in the light guide plate 100, and the positional relationship among the reflector sheet and the light incidence face, the light exit face and the light source are not shown in the backlight module 10 of FIG. 5 and FIG. 6, since these have been described in detail in the exemplary embodiments described above.

The backlight module 10 according to the exemplary embodiments described above adopts the light guide plate 100 in each exemplary embodiment as described above, which acts as one of the primarily components in the backlight module 10. The backlight module 10 can also be applied to a flexible LCD display panel. Based on the technical effects of the light guide plate 100 in the exemplary embodiments as described above, the backlight module 10 according to exemplary embodiments also has a structure with excellent flexibility, and the overall structure has a relatively high elastic deformation. Therefore, even if the backlight module 10 is bent to a certain angle under an external stress for a long period of time, the phenomenon of structural aging and damage is less likely to occur. This solves the following problems in known flexible LCD display panels. In known flexible LCD display panels, the backlight module is required to be bent by a certain angle which causes a decrease in the service life of the light guide plate in the backlight module due to aging. Additionally, plastic deformation may result in light leakage in the display panel.

According to exemplary embodiments, the light guide plate comprises a flexible base layer, a photonic crystal array layer on the flexible base layer, and a transparent planarization layer encapsulating the photonic crystal array layer, wherein the photonic crystal array layer comprises a plurality of photonic crystals which are arranged in an array. Based on the structure of the light guide plate as described above, i.e., the photonic crystals creates a two-dimensional optical reflection face of on the flexible base layer. As a result, after the light from the light source enters the photonic crystal array layer of the light guide plate, it is subject to multiple diffuse reflections in the photonic crystals which are arranged in an array, so that the light reflection mechanism is destroyed. The requirements of uniform distribution of light in the light guide plate can be realized, which improves the planar distribution characteristic of the light source. Namely, the light guide plate is suitable for the backlight module of LCD display panel. In the light guide plate according to exemplary embodiments, both the flexible base layer and the photonic crystals have an excellent structural flexibility, and the overall structure has a relatively high elastic deformation. Even if the light guide plate is subject to external stress for a long period of time and is bent to a certain angle, the light guide plate is less subject to phenomenon of structural aging and damage. This solves the following problems in known flexible LCD display panels. In known flexible LCD display panels, the backlight module is required to be bent to a certain angle, causing decrease in the service life of the light guide plate in the backlight module due to aging. Additionally, plastic deformation may cause the problem of light leakage in the display panel.

Based on the backlight module 10 in exemplary embodiments as described above, exemplary embodiments further provide a display panel. In exemplary embodiments, the display panel adopts the light guide plate 100 as described above as a component of the backlight unit. Namely, the display panel can be a flexible LCD display panel, and the flexible LCD display panel can comprise the backlight module 10 in any of the exemplary embodiments as described in FIG. 5 or FIG. 6. Based on the technical effects of the backlight module 10 in the exemplary embodiments described above, the display panel according to exemplary embodiments has identical technical effects, which are not repeated for simplicity.

Based on the light guide plate 100 in exemplary embodiments as described above, exemplary embodiments of the present disclosure further provide a method for fabricating a light guide plate, the method for fabricating the light guide plate is used for fabricating the light guide plate 100 in any one of the exemplary embodiments as described above.

Figure 7:
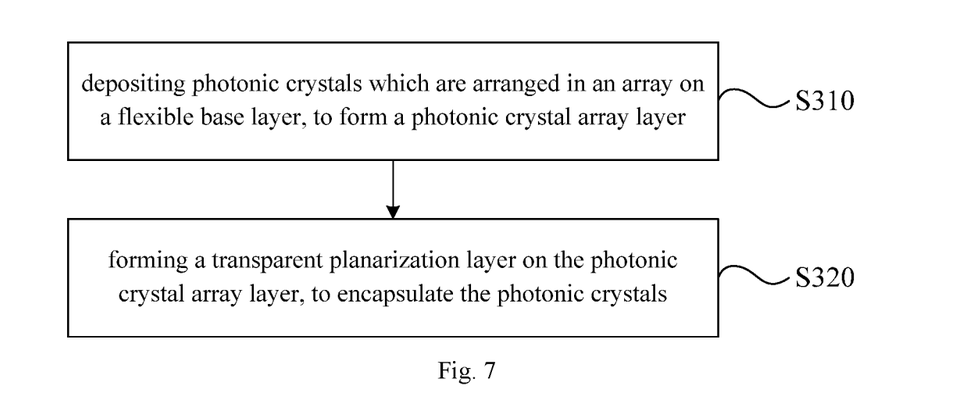
FIG. 7 is a flow chart for illustrating a method for fabricating a light guide plate according to exemplary embodiments.

FIG. 7 shows a flow chart for a method for fabricating a light guide plate according to exemplary embodiments. The method of exemplary embodiments can comprise the following steps:

S310, depositing photonic crystals which are arranged in an array on a flexible base layer, to form a photonic crystal array layer; and S320, forming a transparent planarization layer on the photonic crystal array layer, to encapsulate the photonic crystals.

In exemplary embodiments, reference can be made to FIG. 1 and FIG. 2, in which a cross-sectional view and a top view of the light guide plate 100 are shown respectively. The light guide plate fabricated by the method according to exemplary embodiments can be applied to the backlight module of the flexible LCD display panel. The backlight module can act as an edge type backlight unit of the LCD display panel, and can also act as a direct type backlight unit of the LCD display panel. As the backlight module of the flexible LCD display panel, the light guide plate is a primary structure of the backlight module and has an overall structure with flexible deformation performance. Therefore, the light guide plate can adopt a flexible base layer act as a substrate for the overall structure.

Figure 8:
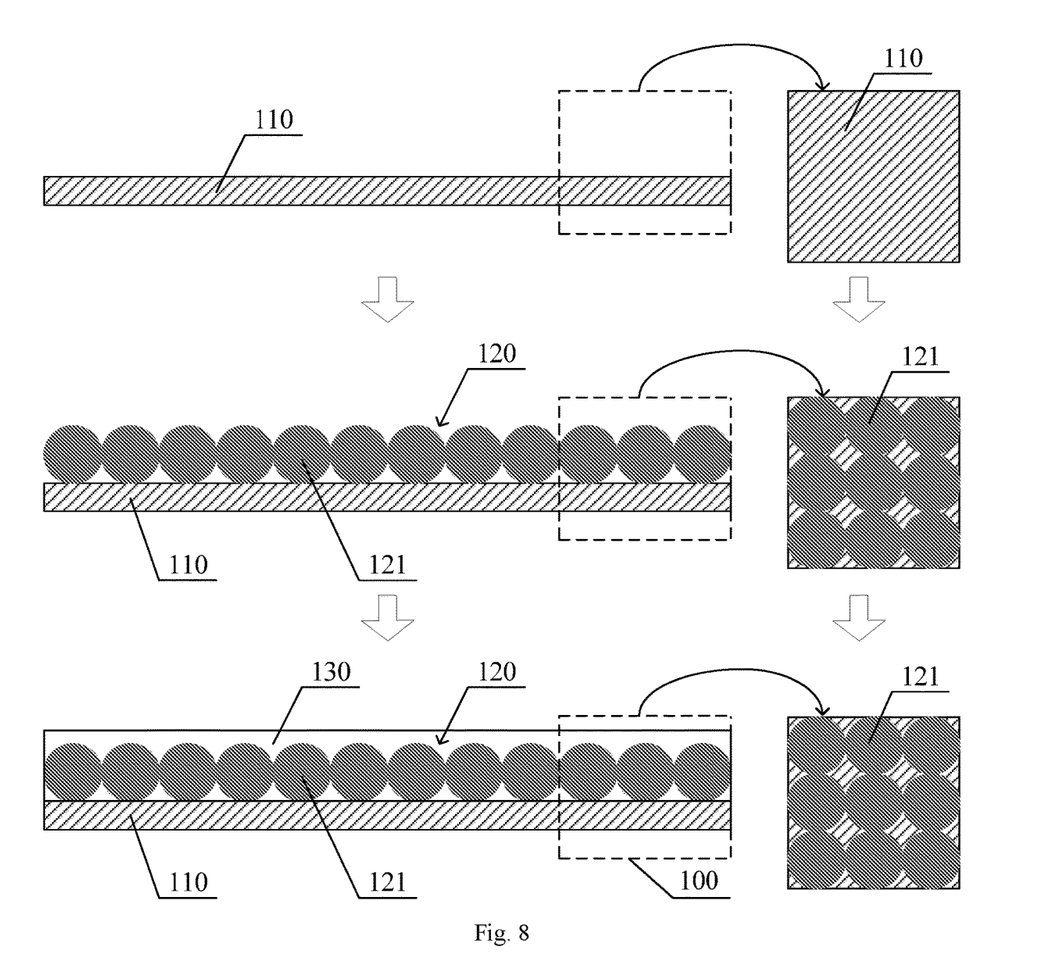
FIG. 8 is a flow chart for illustrating a method for fabricating a light guide plate according to exemplary embodiments.

FIG. 8 is a flow chart for a method for fabricating a light guide plate according to exemplary embodiments. FIG. 8 shows the flexible base layer 110 which acts as a substrate for the overall structure of the light guide plate. FIG. 8 also shows cross-sectional views and top views during fabricating process. It is noted that the top views are shown as reference drawings during fabricating process. The top views only show some of the contents in the cross-sectional views, i.e., the structure of the portion denoted by a dashed box. The photonic crystals 121 is deposited by dipping on an upper surface of the flexible base layer 110, so that the photonic crystal array layer 120 is formed. Based on the arrangement of the photonic crystals 121 in exemplary embodiment as described above, the photonic crystals 121 can be deposited in an array.

After depositing the photonic crystals 121 to form the photonic crystal array layer 120, the photonic crystal array layer 120 is formed by the plurality of photonic crystals 121 which are arranged in an array, and these photonic crystals 121 are round spherical crystals attached onto the flexible base layer 110. As can be seen from FIG. 8, a contact area between the photonic crystals 121 and the flexible base layer 110 is relatively small, and a contact area between the neighboring photonic crystals 121 is also relatively small. Therefore, the photonic crystal array layer 120 formed by the photonic crystals 121 has a relatively poor structural stability. Based on the reasons as described above, a layer of the transparent planarization layer 1300 can be formed on the photonic crystal array layer 120. The transparent planarization layer 130 can be formed by a liquid solvent. E.g., the liquid solvent can be dipped and coated on the photonic crystal array layer 120, to encapsulate the photonic crystals 121, fill up the gap between the photonic crystal array layer 120 and the flexible base layer 110, and planarize the upper surface of the photonic crystal array layer 120 (i.e., a face of the photonic crystal array layer 120 away from the flexible base layer 110). FIG. 8 shows the photonic crystal array layer 120 and the transparent planarization layer 130 after planarization. The transparent planarization layer 130 is shown as a transparent film covering the photonic crystal array layer 120.

The light guide plate fabricated by the method according to exemplary embodiments comprises photonic crystals which are arranged in an array. These photonic crystals can create a two-dimensional optical reflection face on the flexible base layer. As a result, after the light from the light source is incident onto the photonic crystal array layer of the light guide plate, it is subject to multiple diffuse reflections in the photonic crystals which are arranged in an array, so that the light reflection mechanism is destroyed. The requirements of uniform distribution of light in the light guide plate can be realized, which improves the planar distribution characteristic of the light source. Namely, due to the effect of the light guide plate on light, the light guide plate can be deemed as a planar light source in case it acts as a light source.

In addition, in the light guide plate fabricated by the method according to exemplary embodiments, due to the effect of the photonic crystal array layer on the incident light (i.e., multiple diffuse reflections in photonic crystals), light is uniformly distributed in the light guide plate. Therefore, as compared with the light guide plate in known LCD display panels, in the light guide plate fabricated by the method according to embodiments of the present disclosure, due to the two-dimensional optical reflection face created by the photonic crystals which are arranged in an array on the flexible base layer, light enters the light guide plate and then is subject to multiple diffuse reflections in the photonic crystals which are arranged in an array. As a result, the light reflection mechanism is destroyed, so that the light source formed by the light in the light guide plate has an improved planar distribution characteristic.

In the method for fabricating a light guide plate according to exemplary embodiments, photonic crystals which are arranged in an array are deposited on a flexible base layer, to form a photonic crystal array layer, and a transparent planarization layer is formed on the photonic crystal array layer, to encapsulate the photonic crystals. In the light guide plate fabricated by the method as described above, the photonic crystals on the flexible base layer create a two-dimensional optical reflection face. As a result, after the light from the light source enters the photonic crystal array layer of the light guide plate, it is subject to multiple diffuse reflections in the photonic crystals which are arranged in an array, so that the light reflection mechanism is destroyed. The requirements of uniform distribution of light in the light guide plate can be realized, which improves the planar distribution characteristic of the light source. Namely, the light guide plate is suitable for the backlight module of LCD display panel. In the light guide plate fabricated by the method according to exemplary embodiments, both the flexible base layer and the photonic crystals have an excellent structural flexibility, and the overall structure has a relatively high elastic deformation. Even if the light guide plate is bent to a certain angle under an external stress for a long period of time, the phenomenon of structural aging and damage is less likely to occur. This solves the following problems in the known flexible LCD display panel. In the known flexible LCD display panel, the backlight module is required to be bent to a certain angle. This causes a decrease in the service life of the light guide plate in the backlight module due to aging. Additionally, plastic deformation may cause the problem of light leakage in the display panel.

It is noted that as for the material and dimension of photonic crystals in exemplary embodiments, reference can be made to photonic crystals of the light guide plate in the above exemplary embodiments. Namely, the photonic crystals can be photonic crystals of an inorganic material like silicon dioxide, and can have nano-scale dimensions. In addition, as for the arrangement of the reflection layer of the light guide plate, reference can also be made to the light guide plate in the above exemplary embodiments, which are not repeated for simplicity.

Figure 9:
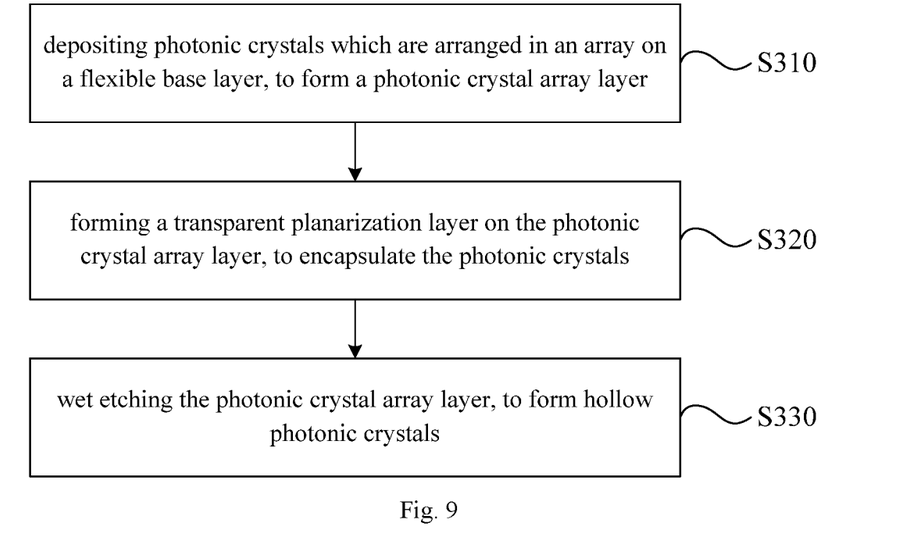
FIG. 9 is a flow chart for illustrating a method for fabricating a light guide plate according to exemplary embodiments.

Optionally, in exemplary embodiments, the material for forming the transparent planarization layer can be a surfactant solution. Namely, the transparent planarization layer can also be referred to as a surfactant layer. The surfactant solution can be attached onto the photonic crystals which are arranged in an array, to fill up the gap between the photonic crystals and the flexible base layer and the gap between neighboring photonic crystals, and planarize the upper surface of photonic crystal array layer. FIG. 9 shows a flow chart for a method for fabricating a light guide plate according to exemplary embodiments. On basis of the process shown in FIG. 7, after S320, the method according to exemplary embodiments can further comprise:

S330, wet etching the photonic crystal array layer, to form hollow photonic crystals.

Figure 10:
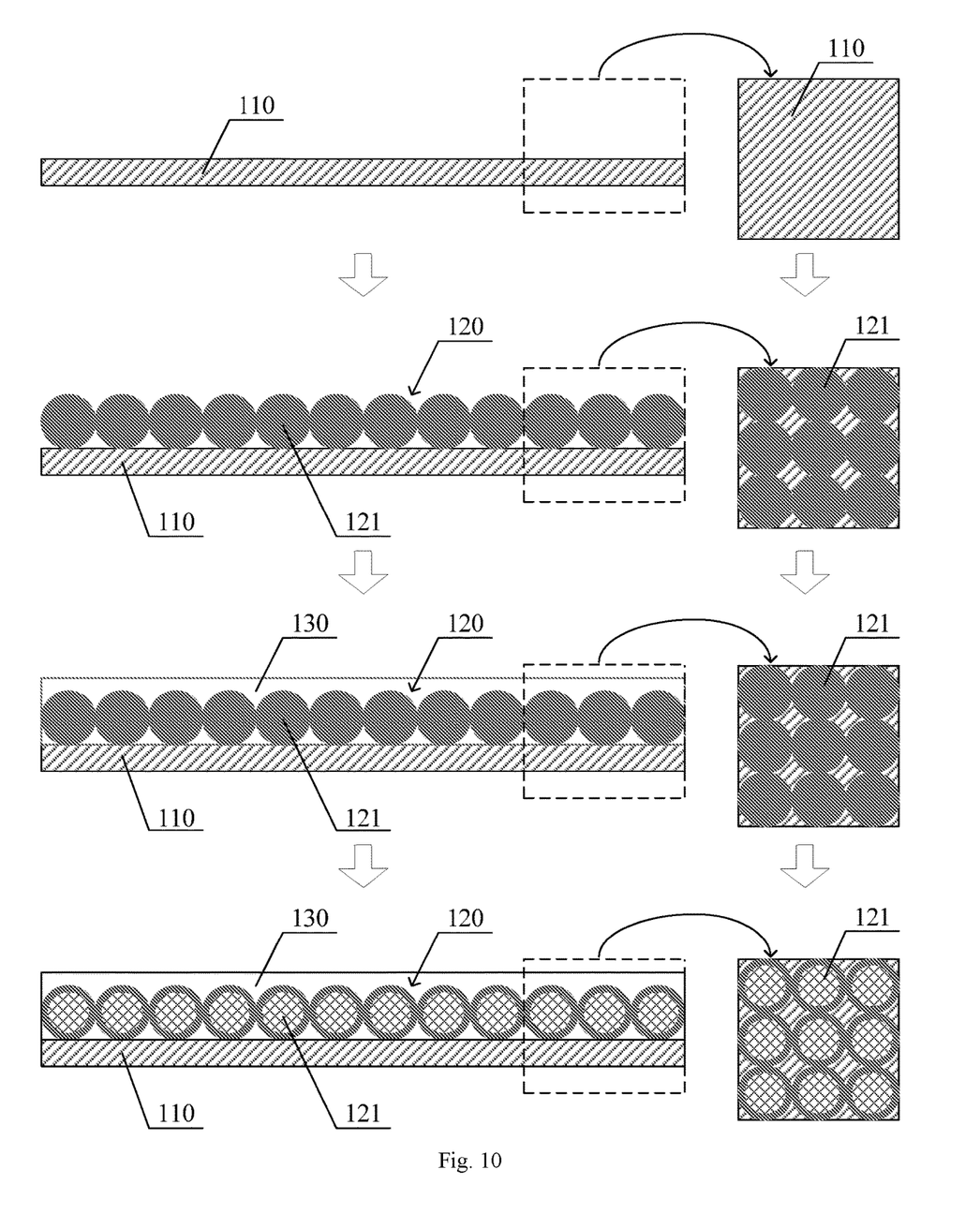
FIG. 10 is a flow chart for illustrating a method for fabricating a light guide plate according to exemplary embodiments.

FIG. 10 is a flow chart for a method for fabricating a light guide plate according to exemplary embodiments. FIG. 10 also shows cross-sectional views and top views during fabricating process. It is noted that the top views are shown as reference drawings during a fabricating process. The top views only show some of the contents in the cross-sectional views, i.e., the structure of the portion denoted by a dashed box. On basis of the process shown in FIG. 8, in exemplary embodiments, the photonic crystals 121 encapsulated by the surfactant solution (i.e., the transparent planarization layer 130) as described above is dipped into the wet etching solution. The etching solution can penetrate the surfactant solution to erode the interior of the solid photonic crystals 121. However, due to protection of the surfactant solution, the surface of the solid photonic crystals 121 and the surfactant solution where they are attached is not eroded by the etch solution. Namely, the solid photonic crystals 121 is etched into the hollow photonic crystals 121 with an outer shell, and an internal surface of the outer shell has a certain roughness. Therefore, the array of these hollow photonic crystals 121 creates a two-dimensional optical reflection face on the flexible base layer 110, and has improved effect of diffuse reflection on the light incident onto the photonic crystal array layer 120 of the light guide plate 100. As a result, the planar distribution characteristic of the light guide plate 100 acting as light source is improved. Namely, the uniformity of light in the overall light guide plate 100 is improved.

A person with ordinary skill in the art can make various modifications and variations to exemplary embodiments disclosed in the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A light guide plate, comprising:
a flexible base layer;
a photonic crystal array layer on the flexible base layer; and
a transparent planarization layer encapsulating the photonic crystal array layer,
wherein the photonic crystal array layer comprises photonic crystals which are arranged in an array;
wherein the photonic crystals are spherical structures of equal size and the photonic crystal array layer is a closely-stacked structure which is formed by the photonic crystals arranged in the array; and
wherein the photonic crystals of the photonic crystal array layer have hollow structures and have rough internal surfaces.

2. The light guide plate of claim 1, wherein the photonic crystals of the photonic crystal array layer are crystals of inorganic silicon dioxide.

3. The light guide plate of claim 1, wherein the photonic crystals of the photonic crystal array layer are nanoscale crystals.

4. The light guide plate of claim 1, wherein the transparent planarization layer comprises a surfactant.

5. The light guide plate of claim 1, wherein the transparent planarization layer is made from a liquid solvent, and fills up a gap between the photonic crystal array layer and the flexible base layer.

6. The light guide plate of claim 1, further comprising a first reflector sheet on a side of the flexible base layer away from the photonic crystal array layer, and second reflector sheets on four side faces of the light guide plate, respectively.

7. The light guide plate of claim 1, further comprising a first reflector sheet on a side of the transparent planarization layer away from the flexible base layer, and second reflector sheets on four side faces of the light guide plate, respectively.

8. The light guide plate of claim 1, wherein the photonic crystals have a spherical structure.

9. A backlight module, comprising: a light source, and the light guide plate of claim 1.

10. The backlight module of claim 9, wherein the light source is arranged on a side face of the light guide plate.

11. The backlight module of claim 9, wherein the light source is arranged in the light guide plate on a side of the flexible base layer away from photonic crystal array layer.

12. The backlight module of claim 9, wherein the light source is arranged on a side of the transparent planarization layer away from the flexible base layer.

13. A display panel, comprising the backlight module of claim 9.

14. A method for fabricating a light guide plate, comprising:
depositing photonic crystals which are arranged in an array on a flexible base layer, to form a photonic crystal array layer; and
forming a transparent planarization layer on the photonic crystal array layer, to encapsulate the photonic crystals,
wherein the photonic crystals are spherical structures of equal size and the photonic crystal array layer is a closely-stacked structure which is formed by the photonic crystals arranged in the array; and
wherein the photonic crystals of the photonic crystal array layer have hollow structure and have rough internal surfaces.

15. The method for fabricating a light guide plate of claim 14, wherein the transparent planarization layer is a surfactant layer which is coated to surround the photonic crystal array layer, after forming the transparent planarization layer, the method further comprises:
wet etching the photonic crystal array layer to form hollow photonic crystals.

* * * * *